(12) United States Patent
Lin

(10) Patent No.: US 11,907,211 B2
(45) Date of Patent: Feb. 20, 2024

(54) DATA EXPLORATION MANAGEMENT METHOD AND SYSTEM, ELECTRONIC DEVICE, AND STORAGE MEDIUM

(71) Applicant: SHENZHEN WITHSUM TECHNOLOGY LIMITED, Guangdong (CN)

(72) Inventor: Yu Lin, Guangdong (CN)

(73) Assignee: Shenzhen Withsum Technology Limited, Shenzhen (CN)

(*) Notice: Subject to any disclaimer, the term of this patent is extended or adjusted under 35 U.S.C. 154(b) by 416 days.

(21) Appl. No.: 16/632,908

(22) PCT Filed: Aug. 29, 2018

(86) PCT No.: PCT/CN2018/102993
§ 371 (c)(1),
(2) Date: Jan. 22, 2020

(87) PCT Pub. No.: WO2019/052339
PCT Pub. Date: Mar. 21, 2019

(65) Prior Publication Data
US 2020/0167352 A1    May 28, 2020

(30) Foreign Application Priority Data
Sep. 13, 2017 (CN) .......................... 201710822644.2

(51) Int. Cl.
*G06F 16/24* (2019.01)
*G06F 16/242* (2019.01)
*G06F 16/2458* (2019.01)
*G06F 8/30* (2018.01)

(52) U.S. Cl.
CPC ............ *G06F 16/2443* (2019.01); *G06F 8/30* (2013.01); *G06F 16/2448* (2019.01); *G06F 16/2462* (2019.01)

(58) Field of Classification Search
CPC .................................................. G06F 16/2443
See application file for complete search history.

(56) References Cited

U.S. PATENT DOCUMENTS

| | | | |
|---|---|---|---|
| 9,436,586 B1* | 9/2016 | Fagen | G06F 11/3688 |
| 9,727,604 B2* | 8/2017 | Jin | G06F 16/258 |
| 10,419,483 B1* | 9/2019 | Allen | G06F 9/45516 |
| 10,862,709 B1* | 12/2020 | Dickinson | H04L 45/38 |
| 2007/0214171 A1* | 9/2007 | Behnen | G06F 8/60 |
| | | | 707/999.102 |

(Continued)

*Primary Examiner* — Mohammad S Rostami

(57) ABSTRACT

Disclosed is a data exploration management method, including: acquiring data input by a user, where the data includes data content and an exploration variable; acquiring a pre-stored flow selected by the user, where the pre-stored flow is used to perform data exploration on the data; acquiring an operation, a method, and flow program code of the pre-stored flow, and generating and storing output program code; running the output program code, and acquiring and storing a running result; and displaying the pre-stored flow, the output program code, and the running result. According to the foregoing method, scientific management on a data exploration process ensures that the data exploration process is repeatable, and that an operation and a method of the data exploration process can be invoked, shared, and reused in real time.

6 Claims, 4 Drawing Sheets

(56) References Cited

U.S. PATENT DOCUMENTS

| | | | |
|---|---|---|---|
| 2010/0306736 A1* | 12/2010 | Bordelon | G06F 8/34 717/109 |
| 2011/0072419 A1* | 3/2011 | Archambault | G06F 8/43 717/146 |
| 2012/0233590 A1* | 9/2012 | Ranganathan | G06F 8/30 717/106 |
| 2013/0055217 A1* | 2/2013 | Boxall | G06F 11/3624 717/129 |
| 2014/0351775 A1* | 11/2014 | Alfieri | G06F 30/33 716/102 |
| 2014/0351795 A1* | 11/2014 | Alfieri | G06F 30/33 717/125 |
| 2017/0024304 A1* | 1/2017 | Dirscherl | G06F 11/28 |
| 2017/0060948 A1* | 3/2017 | Ma | G06F 16/2246 |
| 2017/0075792 A1* | 3/2017 | Udvuleanu | G06F 11/3664 |
| 2017/0192777 A1* | 7/2017 | Apte | G06F 8/76 |
| 2017/0242780 A1* | 8/2017 | Arbel | G06F 11/3664 |
| 2018/0129581 A1* | 5/2018 | Abadi | G06F 11/3608 |
| 2018/0373509 A1* | 12/2018 | Zhang | G06F 8/37 |
| 2019/0005161 A1* | 1/2019 | Fleming | G06F 12/0862 |
| 2019/0018761 A1* | 1/2019 | Ramraz | G06F 11/3688 |
| 2019/0087075 A1* | 3/2019 | Dhayanithi | G06F 11/3664 |
| 2019/0129732 A1* | 5/2019 | Sivertson | G06N 7/005 |

* cited by examiner

DATA EXPLORATION MANAGEMENT METHOD AND SYSTEM, ELECTRONIC DEVICE, AND STORAGE MEDIUM

CROSS-REFERENCE TO RELATED APPLICATIONS

This application is the U.S. National Stage Application of International Patent Application No. PCT/CN2018/102993, filed on Mar. 21, 2019, which claims priority to Chinese Patent Application No. 201710822644.2, filed on Sep. 13, 2017, the contents of each of which is incorporated herein by reference in its entirety.

TECHNICAL FIELD

The present invention relates to the field of electronic information technologies, and in particular, to a data exploration management method and system, an electronic device, and a storage medium.

BACKGROUND

As science and technology rapidly develop and massive scientific data continuously emerges, a growing quantity of data explorations and technological innovations are conducted based on data.

There are many types of data that is massive in quantity and is rapidly updated. This imposes a higher requirement on data exploration. Data exploration focuses not only on the final result, but also on a data track in the entire process. Currently, a data exploration process usually requires a combination of a plurality of methods. Researchers select a method based on their knowledge as well as experience, write program code for the method, run the program code and acquire a result, and then select a next method based on the result, until the final result is acquired and no further method is required.

It can be seen that, currently, the data exploration process varies from person to person, lacks necessary management on an intermediate link, and is unrepeatable, and reliability of the entire process and the result cannot be tested or reviewed. In addition, due to the lack of complete operation information and method information in the data exploration process, the researchers cannot use the same operation and method for new research or apply initial data to other operations and methods to study what new results these changes lead to.

SUMMARY

To overcome disadvantages of the prior art, a first objective of the present invention is to provide a data exploration management method to implement scientific management on a data exploration process, thereby ensuring that the data exploration process is repeatable, and an operation and a method of the data exploration process can be invoked, shared, and reused in real time.

A second objective of the present invention is to provide a data exploration management system to implement scientific management on a data exploration process, thereby ensuring that the data exploration process is repeatable, and that an operation and a method of the data exploration process can be invoked, shared, and reused in real time.

A third objective of the present invention is to provide an electronic device to implement scientific management on a data exploration process, thereby ensuring that the data exploration process is repeatable, and that an operation and a method of the data exploration process can be invoked, shared, and reused in real time.

A fourth objective of the present invention is to provide a computer-readable storage medium to implement scientific management on a data exploration process, thereby ensuring that the data exploration process is repeatable, and that an operation and a method of the data exploration process can be invoked, shared, and reused in real time.

The first objective of the present invention is achieved by the following technical solution.

A data exploration management method includes the following steps:
  data acquisition: acquiring data input by a user, where the data includes data content and an exploration variable;
  pre-stored flow selection: acquiring a pre-stored flow selected by the user, where the pre-stored flow is used to perform data exploration on the data;
  program code generation: acquiring an operation, a method, and flow program code of the pre-stored flow, and generating and storing the program code; and
  program code running: running the output program code, and acquiring and storing a running result.

Further, the method includes the following step:
  result display: displaying the pre-stored flow, the output program code, and the running result.

Further, the data content includes a database, a data table, and a data file.

Further, the pre-stored flow includes a node, a path, the method, and the flow program code, the node and the path constitute the operation, the method includes a pre-stored method, and the flow program code is used to execute the pre-stored flow.

Further, the pre-stored method includes a statistical method and method program code, and the method program code is used to execute the pre-stored method.

Further, the flow program code invokes the method program code to generate the output program code.

The second objective of the present invention is achieved by the following technical solution.

A data exploration management system includes: a pre-stored method module, a pre-stored flow module, a data acquisition module, a flow selection module, a program code generation module, a program code running module, and a result display module, where the pre-stored method module is connected to the pre-stored flow module, the pre-stored flow module and the data acquisition module are connected to the flow selection module, the flow selection module is connected to the program code generation module, the program code generation module is connected to the program code running module, and the program code running module is connected to the result display module; and
  the data acquisition module acquires data input by a user, the flow selection module acquires a pre-stored flow in the pre-stored flow module based on the data, the pre-stored flow module acquires a pre-stored method and method program code in the pre-stored method module based on the pre-stored flow, the flow selection module acquirers a pre-stored flow selected by the user, the program code generation module generates and stores output program code, the program code running module runs the output program code and acquires and stores a running result, and the result display module displays the pre-stored flow, the output program code, and the running result.

The third objective of the present invention is achieved by the following technical solution.

An electronic device includes: a processor,
a memory, and a program, where the program is stored in the memory and is configured to be executed by the processor, and the program is used to execute the method.

The fourth objective of the present invention is achieved by the following technical solution.

A computer-readable storage medium with a computer program stored is provided, where the computer program is executed by a processor to implement the method.

Compared with the prior art, beneficial effects of the present invention lie in:

The present invention provides a data exploration management method, and further relates to a data exploration management system, an electronic device, and a computer-readable storage medium. A pre-stored flow is selected; an operation, a method, and flow program code of the pre-stored flow are acquired, and output program code is generated and stored; the output program code is run, and a miming result is acquired and stored; the pre-stored flow, the output program code, and the running result are displayed. In this way, scientific management is implemented on a data exploration process, thereby ensuring that the data exploration process is repeatable, and that an operation and a method of the data exploration process can be invoked, shared, and reused in real time.

BRIEF DESCRIPTION OF THE DRAWINGS

The accompanying drawings described here are provided for further understanding of the present invention, and constitute a part of the application. The exemplary embodiments and illustrations thereof of the present invention are intended to explain the present invention, but do not constitute inappropriate limitations to the present invention. In the accompanying drawings.

DETAILED DESCRIPTION

The present invention is further described below with reference to the accompanying drawings and specific implementations. It should be noted that the embodiments or technical features described below can be arbitrarily combined to form a new embodiment provided that no conflict occurs.

Figure 1:
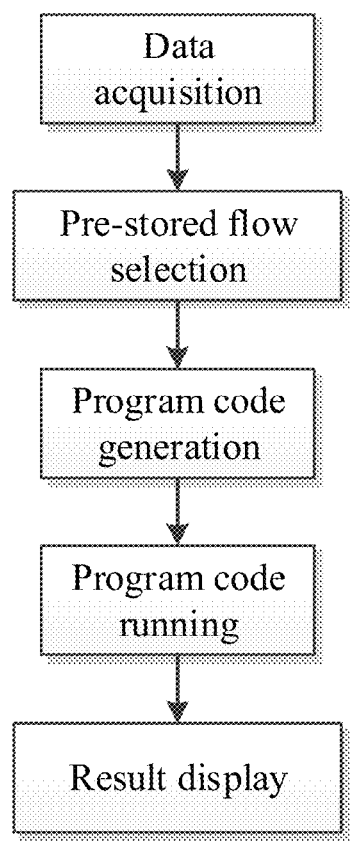
FIG. 1 is a flow chart of a data exploration management method according to the present invention.
Figure 2:
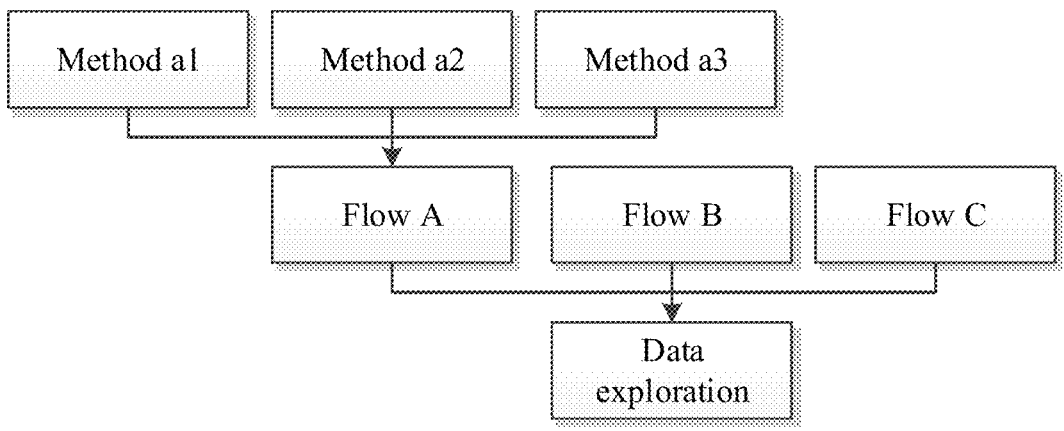
FIG. 2 is a flow chart of data exploration according to the present invention.

As shown in FIG. 1 and FIG. 2, a data exploration management method includes the following steps:

Data acquisition: acquire data input by a user, where the data includes data content and an exploration variable;
pre-stored flow selection: acquire a pre-stored flow selected by the user, where the pre-stored flow is used to perform data exploration on the data;
program code generation: acquire an operation, a method, and flow program code of the pre-stored flow, and generate and store output program code;
program code running: run the output program code, and acquire and store a running result; and
result display: display the pre-stored flow, the output program code, and the miming result.

The data content includes a database, a data table, and a data file. In addition, the data content is invoked by the program code.

The pre-stored flow selection is described as follows: A system provides a flow selection interface for the user to select a to-be-executed pre-stored flow; and in this way, the pre-stored flow selected by the user is acquired, where the pre-stored flow is used to perform data exploration on the data.

The pre-stored flow includes a node, a path, the method, and the flow program code. The node and the path constitute the operation. The method includes a pre-stored method. The flow program code is used to execute the pre-stored flow. The pre-stored method includes a statistical method and method program code. The method program code is used to execute the pre-stored method.

The flow program code invokes the method program code to generate the output program code.

The step of pre-stored flow selection and the step of program code generation constitute a standardized exploration process. One data exploration requires a plurality of flows, and a plurality of methods are used in each flow. As shown in FIG. 2, it is assumed that three flows, namely, flow A, flow B, and flow C, are selected to be performed for the data exploration. Method a1, method a2, and method a3 are used in the flow A. To be specific, when the step of pre-stored flow selection and the step of program code generation are being performed, pre-stored flows include the flow A, the flow B, and the flow C. When the data exploration is being performed, the three pre-stored flows are selected. In this case, the method a1, the method a2, and the method a3 in the flow A, method program code, and flow program code are automatically acquired, thereby generating output program code of the flow A.

Figure 3:
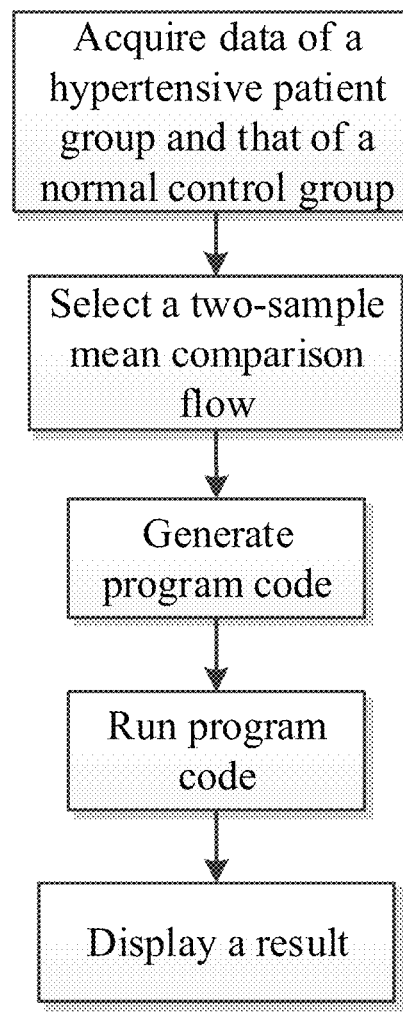
FIG. 3 is a flow chart of a first embodiment of the present invention.
Figure 4:
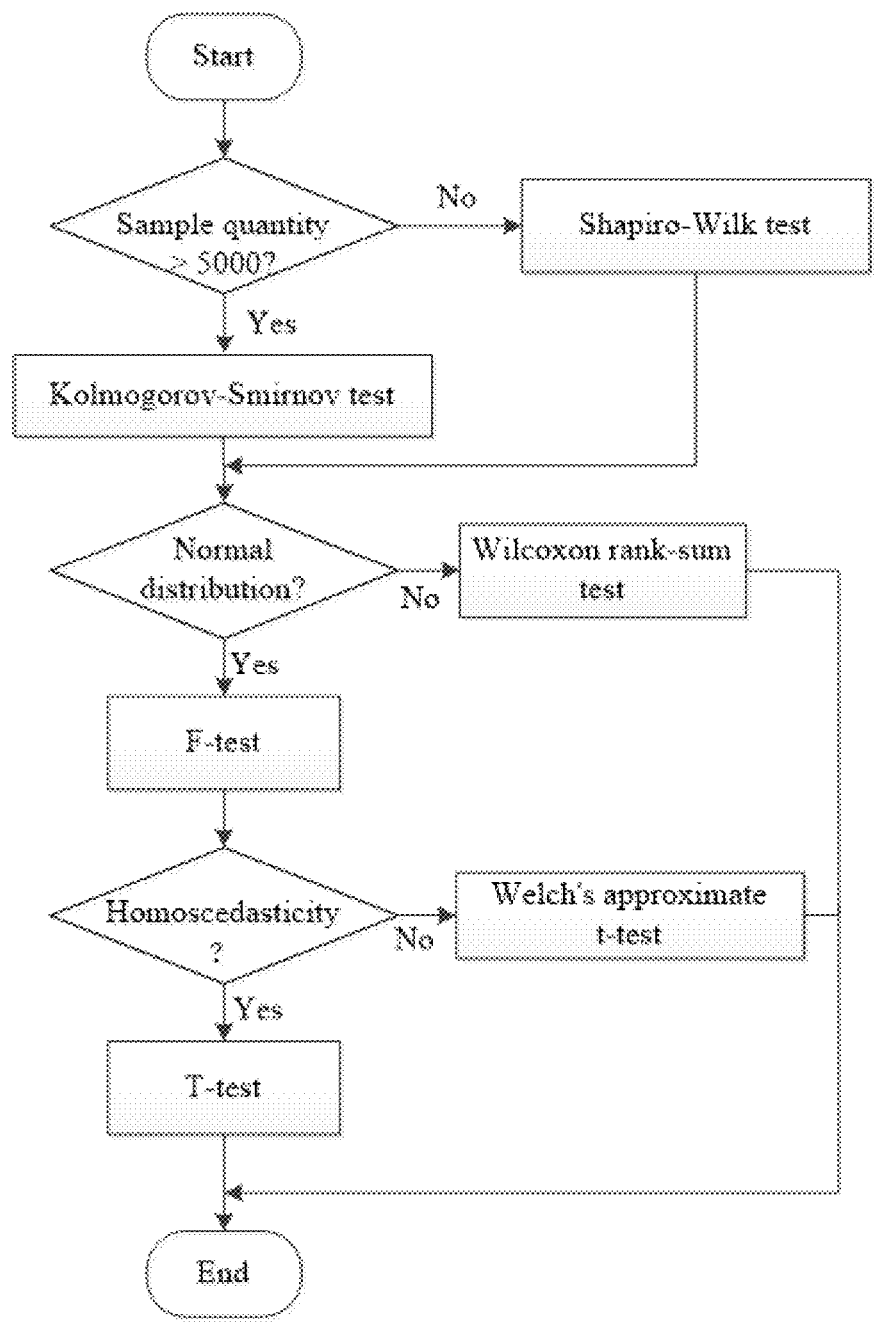
FIG. 4 is a flow chart of a two-sample mean comparison flow in a first embodiment of the present invention.
Figure 5:
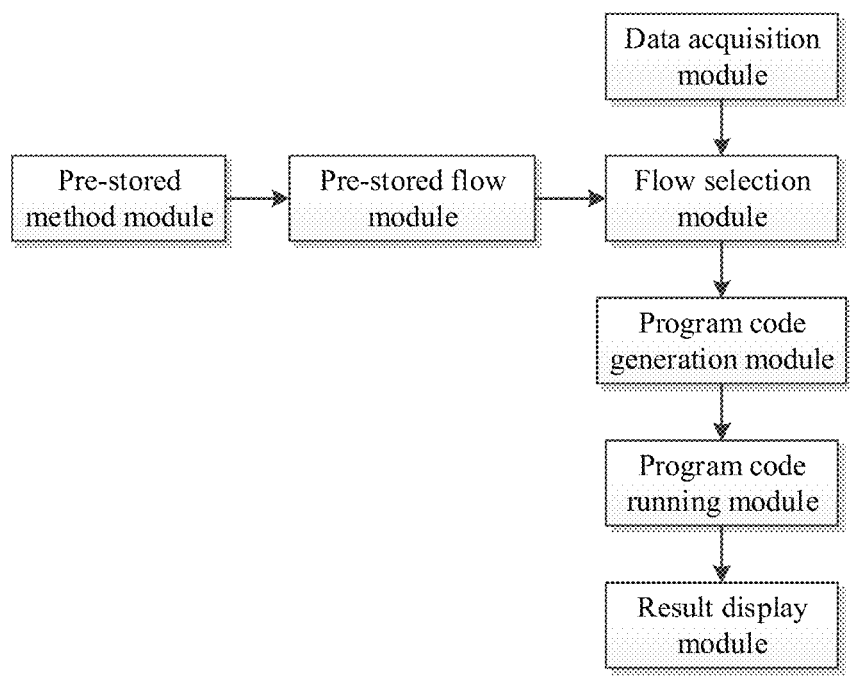
FIG. 5 is a diagram of module connection in a data exploration management system according to the present invention.

A first embodiment of the present invention is applied to scientific research data exploration. As shown in FIG. 3 and FIG. 4, steps for exploring hypertension research data are as follows:

Data acquisition: acquire systolic and diastolic pressure data content of a hypertensive patient group and a normal control group and an exploration variable that are input by a user;
pre-stored flow selection: acquire a two-sample mean comparison flow selected by the user, where the flow is used to perform data exploration on the data;
program code generation: acquire an operation, a method, and flow program code of the two-sample mean comparison flow, and generate and store corresponding output program code;
program code running: run the output program code of the two-sample mean comparison flow, and acquire and store a corresponding running result; and
result display: display the two-sample mean comparison flow, the corresponding output program code, and the corresponding running result.

As shown in FIG. 4, when the hypertension research data is being explored, specific steps of the two-sample mean comparison flow are as follows:

Normality test: determine whether a sample quantity of the data content is greater than 5000. If yes, perform a Kolmogorov-Smirnov test on the data content, and output a normality test result; otherwise, perform a Shapiro-Wilk test on the data content, and output a normality test result.

Homoscedasticity test: If the normality test result is that the data content conforms to a normal distribution, perform an F-test on the data content, and output a homoscedasticity result; otherwise, perform a Wilcoxon rank-sum test on the data content.

Mean comparison: If the homoscedasticity result is that the data content conforms to homoscedasticity, perform a T-test on the data content; otherwise, perform a Welch's approximate t-test on the data content.

In conclusion, for the two-sample mean comparison flow, the T-test is used when the systolic and diastolic pressure data of the hypertensive patient group and the normal control group conforms to the normal distribution and homoscedasticity; the Welch's approximate t-test is used when the data conforms to the normal distribution but does not conform to the homoscedasticity; and the Wilcoxon rank-sum test is used when the data does not conform to the normal distribution.

In conclusion, with reference to the foregoing description, in this embodiment, pre-stored methods used in the two-sample mean comparison flow include: the Kolmogorov-Smirnov test, the Shapiro-Wilk test, the Wilcoxon rank-sum test, the F-test, the Welch's approximate t-test, and the T-test.

In this embodiment, for ease of description, only the two-sample mean comparison flow is described as an example. In an actual exploration process, many flows need to be performed for exploring the hypertension research data. For example, a two-sample rate comparison flow is selected; an operation, a method, and flow program code of the two-sample rate comparison flow are acquired, and corresponding output program code is generated and stored; the corresponding output program code is run, and a corresponding running result is acquired and stored; and the two-sample rate comparison flow, the corresponding output program code, and the corresponding running result are displayed for comparing whether there is a difference in rate between the hypertensive patient group and the normal control group.

A second embodiment of the present invention is applied to health data exploration. On the basis of the first embodiment, the flow, the method, and the like for exploring the hypertension research data in the first embodiment are changed to a corresponding flow and method for exploring health data, thereby facilitating a user in doing research on health data exploration.

A third embodiment of the present invention is applied to education data exploration. On the basis of the first embodiment, the flow, the method, and the like for exploring the hypertension research data in the first embodiment are changed to a corresponding flow and method for exploring education data, thereby facilitating a user in doing research on education data exploration.

A data exploration management system includes a pre-stored method module, a pre-stored flow module, a data acquisition module, a flow selection module, a program code generation module, a program code miming module, and a result display module. The pre-stored method module is connected to the pre-stored flow module. The pre-stored flow module and the data acquisition module are connected to the flow selection module. The flow selection module is connected to the program code generation module. The program code generation module is connected to the program code running module. The program code running module is connected to the result display module.

The data acquisition module acquires data input by a user. The flow selection module acquires a pre-stored flow in the pre-stored flow module based on the data. The pre-stored flow module acquires a pre-stored method and method program code in the pre-stored method module based on the pre-stored flow. The flow selection module acquirers a pre-stored flow selected by the user. The program code generation module generates and stores output program code. The program code running module runs the output program code, and acquires and stores a running result. The result display module displays the pre-stored flow, the output program code, and the miming result.

An electronic device includes a processor, a memory, and a program. The program is stored in the memory and is configured to be executed by the processor. The program is used to execute the foregoing data exploration management method. A computer-readable storage medium stores a computer program. The computer program is executed by a processor to implement the foregoing data exploration management method.

According to the present invention, the pre-stored flow is selected; the operation, the method, and the flow program code of the pre-stored flow are acquired, and the output program code is generated and stored; the output program code is run, and the miming result is acquired and stored; and the pre-stored flow, the output program code, and the running result are displayed. In this way, scientific management is implemented on the data exploration process, thereby ensuring that the data exploration process is repeatable, and that the operation and the method of the data exploration process can be invoked, shared, and reused in real time.

The foregoing implementations are merely preferred implementations of the present invention, and the protection scope of the present invention cannot be limited thereto. Any insubstantial changes and substitutions made by a person skilled in the art on the basis of the present invention fall within the protection scope claimed by the present invention.

What is claimed is:

1. A data exploration management method, implemented by circuits for implementing functions, comprising:
   acquiring, implemented by the circuits for implementing the functions, data input by a user, wherein the acquired data comprises data content and an exploration variable;
   acquiring, implemented by the circuits for implementing the functions, a pre-stored flow selected by the user,
      wherein the pre-stored flow is to be used to perform data exploration on the acquired data, and
      wherein the pre-stored flow comprises a node, a path, a method, and a flow program code, the node and the path constituting an operation, the method comprising a pre-stored method, the flow program code being usable to execute the pre-stored flow, the pre-stored method comprising a statistical method and a method program code, and the method program code being usable to execute the pre-stored method;
   generating, implemented by the circuits for implementing the functions, an output program code, the generation of the output program code including:
      acquiring, implemented by the circuits for implementing the functions, the operation, the method, and the flow program code of the pre-stored flow;
      generating, implemented by the circuits for implementing the functions, the output program code, wherein the flow program code invokes the method program code to generate the output program code; and storing, implemented by the circuits for implementing the functions, the output program code; and running, implemented by the circuits for implementing the functions, the output program code, and storing, implemented by the circuits for implementing the functions, a result of the running of the output program code;

displaying, implemented by the circuits for implementing the functions, the pre-stored flow, the output program code, and the result of the running of the output program code;

wherein, for one data exploration, there are a plurality of pre-stored flows, and a plurality of methods are used in each of the plurality of pre-stored flows; for each pre-stored flow, when the data exploration is being performed, all methods used in each pre-stored flow, corresponding method program code, and corresponding flow program code are automatically acquired, to generate output program code of each pre-stored flow;

wherein, there are a first pre-stored flow, a second pre-stored flow, and a third pre-stored flow; wherein, a first method, a second method, and a third method are used in the first pre-stored flow; for the first pre-stored flow, when the data exploration is being performed, the first method, the second method, and the third method used in the first pre-stored flow, the corresponding method program code, and the corresponding flow program code are automatically acquired, to generate output program code of the first pre-stored flow.

2. The data exploration management method according to claim 1, wherein the data content comprises at least one of: a database, a data table, and a data file.

3. An electronic device, implemented by circuits for implementing functions, comprising:

a processor, a memory, and a program, wherein the program is stored in the memory and is configured to be executed by the processor, and the program is used to execute the method according to claim 1.

4. An electronic device, implemented by circuits for implementing functions, comprising:

a processor, a memory, and a program, wherein the program is stored in the memory and is configured to be executed by the processor, and the program is used to execute the method according to claim 2.

5. A computer-readable storage medium, implemented by circuits for implementing functions, with a computer program stored, wherein the computer program is executed by a processor to implement the method according to claim 1.

6. A computer-readable storage medium, implemented by circuits for implementing functions, with a computer program stored, wherein the computer program is executed by a processor to implement the method according to claim 2.

* * * * *